United States Patent
Almond et al.

(10) Patent No.: US 9,799,415 B2
(45) Date of Patent: Oct. 24, 2017

(54) METHOD FOR CONTROLLING ALUMINUM DISSOLUTION

(71) Applicant: Savannah River Nuclear Solutions, LLC, Aiken, SC (US)

(72) Inventors: Philip M. Almond, Martinez, GA (US); William E. Daniel, N. Augusta, SC (US); Tracy S. Rudisill, N. Augusta, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 236 days.

(21) Appl. No.: 14/723,933

(22) Filed: May 28, 2015

(65) Prior Publication Data

US 2016/0348254 A1 Dec. 1, 2016

(51) Int. Cl.
C23F 13/00 (2006.01)
G21C 19/46 (2006.01)
C25F 1/00 (2006.01)

(52) U.S. Cl.
CPC ............... *G21C 19/46* (2013.01); *C25F 1/00* (2013.01); *Y02W 30/883* (2015.05)

(58) Field of Classification Search
CPC .......................................... G21C 19/42–19/48
See application file for complete search history.

(56) References Cited

U.S. PATENT DOCUMENTS

| | | |
|---|---|---|
| 3,119,658 A | 1/1964 | Schultz |
| 3,222,125 A * | 12/1965 | Schulz ................... G21C 19/46 423/20 |
| 3,409,413 A | 11/1968 | Burns et al. |
| 3,490,999 A | 1/1970 | Raviv et al. |
| 3,813,464 A | 5/1974 | Ayers et al. |
| 3,932,225 A | 1/1976 | Bilal et al. |
| 4,201,690 A | 5/1980 | Mills et al. |
| 4,270,957 A * | 6/1981 | Donakowski ............ C25D 5/44 134/2 |
| 4,834,936 A | 5/1989 | Hirose |
| 5,190,623 A | 3/1993 | Sasaki et al. |
| 5,686,052 A | 11/1997 | Dancausse et al. |
| 2009/0308760 A1 | 12/2009 | Wei et al. |

FOREIGN PATENT DOCUMENTS

WO    WO 01/41151 A2    6/2001

OTHER PUBLICATIONS

Wymer et al., Uranium-Aluminum Dissolution, Some basic factors in processing spent nuclear fuel, Industrial & Engineering Chemistry, vol. 49, No. 1, Jan. 1957, pp. 59-61.
I. Boukerche, et al., Degradability of aluminum in acidic and alkaline solutions, Corrosion Science, Elsevier, dated Oct. 13, 2013, pp. 343-352.
Guna Selvaduray et al., Survey of Nuclear Fuel Reprocessing Technologies, Conversation and Recycling, dated 1979, vol. 3, pp. 93-134.

* cited by examiner

*Primary Examiner* — Keith Hendricks
*Assistant Examiner* — Salil Jain
(74) *Attorney, Agent, or Firm* — Dority & Manning, P.A.

(57) ABSTRACT

A process for controlling the dissolution of a metal in an acid bath is described. The metal may comprise aluminum and the acid bath may contain a metal catalyst that causes the metal to dissolve. In order to control the rate of dissolution, the metal can be contacted with a cathodic member. In one embodiment, the process can be completely stopped even without removing the metal from the acid bath. The cathodic member provides anodic protection to the metal. In one embodiment, the cathodic member is made from a nickel-chromium-based alloy.

19 Claims, No Drawings

METHOD FOR CONTROLLING ALUMINUM DISSOLUTION

BACKGROUND

A unique characteristic of nuclear energy is that used fuel may be separated from other components and reused as new fuel. For instance, the nuclear materials contained in a spent rod from a nuclear power plant can be reprocessed and reused to produce new fuel rods. Practically all nuclear materials, including uranium and plutonium, can be reprocessed in this manner.

Fuel elements, including fuel rods in nuclear reactors, become unusable not so much on account of actual depletion of the fissionable fuel values, but because of the accumulation within the element of fission products. These fission products can interfere with the neutron flux within the reactor. Consequently, fuel elements are withdrawn from the reactor long before the fuel values are anywhere near to being completely consumed. The withdrawn or used nuclear fuel (sometimes referred to as spent fuel rods) have significant fuel value. At the same time, it is desirable to recover the valuable by-products of reactor operation, the transmutation products such as plutonium, which is a fissionable fuel, and certain isotopes of the fission products which are useful in many different fields and have many different applications.

Many research reactor fuel assemblies or fuel plates contain a nuclear material in combination with aluminum, such as a uranium-aluminum alloy or a uranium aluminide dispersed in a continuous aluminum phase. Aluminum is also widely used as a fuel element cladding material because it has a relatively low neutron absorption cross-section and has excellent physical and chemical properties. One type of aluminum used as a cladding material includes 1100 aluminum. Other alloys include 6061 and 6063.

A conventional process for recovering nuclear materials from used nuclear fuel is a dissolution process during which the aluminum material is dissolved. In one embodiment, the process for recovering fissionable materials is an aqueous process during which the fuel elements are dissolved in an acidic solution. Fuel elements containing an aluminum-uranium alloy contained in aluminum cladding, for instance, may be dissolved in a mercury-catalyzed, nitric acid flowsheet. After the fuel is dissolved in the solution, the uranium can be recovered from the aluminum and fission products. The dissolution process must be carefully controlled to ensure that the used nuclear fuel dissolves at an acceptable rate without producing unacceptable amounts of off-gas.

The off-gas generation rate during nuclear fuel dissolution changes depending upon many factors. Thus, the off-gas generation rate is never constant. Off-gases that are produced include nitrogen oxides, hydrogen gas, in addition to volatile fission product gases, such as krypton, xenon and iodine vapor. The mechanisms that impact off-gas concentrations and species that produce the above gases during the course of dissolution are complex and are not well understood. Spikes in the generation of off-gases, however, can produce significant amounts of hydrogen gas which may rise above safety levels in the processing plant.

In view of the above, a need exists for a method or technique that can control a metal dissolution process. In particular, a need exists for a control mechanism that can control a metal dissolution process, particularly an aluminum dissolution process, in order to make sure that the metal dissolves at an acceptable rate and/or to prevent excessive gas generation rates for, in one embodiment, increasing the safety of the process.

SUMMARY

In general, the present disclosure is directed to a method for controlling the dissolution of a metal, such as aluminum, in an acid bath. In one embodiment, for instance, the present disclosure is directed to a method for controlling aluminum dissolution during the reprocessing of used nuclear fuel, such as during the reprocessing of spent fuel elements or fuel rods. Spent research reactor fuel elements typically contain a uranium-aluminum alloy or uranium aluminide dispersed in a continuous aluminum phase surrounded by an aluminum cladding. In order to reuse and recycle the uranium contained in the fuel rod, the aluminum is dissolved in a dissolution solution containing an acid and a metal catalyst, such as a mercury catalyst. In the past, problems have been experienced in attempting to control the rate of dissolution and the rate of off-gas production. In accordance with the present disclosure, however, it was discovered that contacting the aluminum with a cathodic member during the process can decrease the rate of dissolution. In fact, in one embodiment, the cathodic member can be used to completely stop the process. In this manner, the cathodic member can be used as a safety device for stopping the process when desired. Simply by removing the cathodic member, the process can resume.

In one embodiment, the present disclosure is directed to a process for dissolving aluminum during the recovery of a nuclear fuel. The process includes the steps of contacting a material containing aluminum and a nuclear fuel with a dissolution solution comprising an acid and a metal catalyst. The acid and the metal catalyst dissolve the aluminum. In one embodiment, the acid may comprise nitric acid having an initial concentration of from about 4 molar to about 15 molar. The metal catalyst, on the other hand, may comprise mercury and may be present in the dissolution solution at a concentration of from about 0.001 molar to about 0.02 molar.

In accordance with the present disclosure, in order to control the rate at which the aluminum dissolves, the aluminum can be contacted with a cathodic member. The cathodic member comprises a material capable of forming a galvanic couple with the aluminum. The cathodic member contacts a sufficient amount of surface area of the aluminum so as to decrease the dissolution rate of the aluminum in the dissolution solution. For instance, in one embodiment, the cathodic member can be used to reduce the dissolution rate of aluminum by at least 20%, such as by at least 30%, such as by at least 40%, such as by at least 50%, such as by at least 60%, such as by at least 70%, such as by at least 80%, such as by at least 90%. In one particular embodiment, the cathodic member may be used to completely shut down the process and virtually stop any further aluminum from dissolving.

Various different materials can be used as the cathodic member. In general, any suitable cathodic material may be used that does not adversely interfere with the process or produce any unwanted contaminants. In one embodiment, the cathodic member may comprise a metallic material and/or a material that does not dissolve when contacted with the dissolution solution, such as when contacted with nitric acid. In one embodiment, for instance, the cathodic member may comprise gold, platinum, titanium, a stainless steel alloy, a nickel-copper alloy, or mixtures thereof. In one particular embodiment, the cathodic member comprises a nickel-chromium-based alloy. For instance the cathodic member may comprise an austenitic superalloy containing from about 40% to about 80% nickel and from about 10% to about 30% chromium.

In another embodiment, the cathodic member may comprise graphite.

The process of the present disclosure is particularly well suited for reprocessing and recycling spent research reactor fuel assemblies or fuel plates. During the dissolution process, the aluminum contained in the fuel assemblies may be contacted with the cathodic member for controlling the rate at which the aluminum dissolves. The cathodic member may comprise a rod, bar, collar, or any other suitably shaped structure capable of contacting sufficient surface area of the aluminum for controlling the process. Of particular advantage, the cathodic member can contact the aluminum within the bath.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a process for controlling the dissolution rate of a metal in a dissolution solution. In one embodiment, for instance, the metal may comprise aluminum that is being dissolved in a mercury catalyzed acid bath. As will be explained in detail below, the method of the present disclosure can be used to control the rate at which the metal dissolves and thus can also be used to control the rate at which off-gases are produced during the process. Although the teachings of the present disclosure can be used in numerous and diverse applications, in one embodiment, the method of the present disclosure is used to control dissolution and off-gas rates in a process during the recycling of a used nuclear fuel.

Research reactor fuel assemblies or fuel plates are typically comprised of an aluminum cladding surrounding a nuclear fuel. The nuclear fuel may comprise uranium, plutonium, and mixtures thereof. In one embodiment, the fuel assembly or fuel plate contains an aluminum-uranium alloy contained in the aluminum cladding. Spent fuel assemblies or fuel plates still contain a significant amount of reusable nuclear fuel. In order to reuse the nuclear fuel, in one embodiment, the aluminum is dissolved in an acid in the presence of a metal catalyst which allows the nuclear fuel to be separated from the aluminum.

In one embodiment, for instance, the recovery of fissionable materials comprises the dissolution of fuel assemblies in an acid bath. The acid bath contains a dissolution solution that is comprised of an acid and a metal catalyst. One or more fuel assemblies are slowly lowered into the dissolution solution and the temperature of the solution is elevated. In one embodiment, the acid bath contains nitric acid with a mercury catalyst to dissolve the aluminum/uranium and allow recovery of the uranium from the aluminum and fission products. In the past, attempts were made to carefully control the dissolution process in order to make sure that the fuel element dissolved at an acceptable rate while preventing excessive dissolution and off-gas generation.

The off-gas generation rate during aluminum and nuclear fuel dissolution changes depending upon many factors. In general, the off-gas generation rate is fastest at low dissolved aluminum concentrations, which is typically when the process is initiated. Furthermore, the mechanisms that impact off-gas concentrations and the species that produce gases during the course of the dissolution are complex and not well understood. In accordance with the present disclosure, the dissolution process can be controlled and/or stopped which will thereby also control off-gas production.

In accordance with the present disclosure, the metal dissolution process is controlled by contacting the metal, such as aluminum, with a cathodic member. Contact between the metal and the cathodic member slows down, prevents or stops the metal from dissolving in a dissolution solution. Although unknown, it is believed that the cathodic member creates a galvanic couple with the metal that is dissolving which inhibits the ability of the catalyst present in the dissolution solution from facilitating additional dissolution of the metal.

For instance, in one embodiment, aluminum is dissolved in a dissolution solution containing an acid, such as nitric acid, and a catalyst, such as a mercury catalyst. During the process by which the aluminum is dissolved, mercury ions having a +2 valence are reduced to a zero valence by the aluminum surface. An amalgamation of the aluminum with the mercury then occurs. The mercury-aluminum amalgam is subsequently oxidized by the nitric acid, which dissolves the aluminum and regenerates the mercury ions into the +2 valence state. In accordance with the present disclosure, by contacting the aluminum with a cathodic member, aluminum effectively behaves like an anode and inhibits mercury from being able to reduce to the zero valence state on the aluminum surface. It is believed that this phenomenon disrupts the catalytic cycle and effectively decreases or stops the aluminum dissolution process.

The cathodic member may comprise different and various types of materials. In one embodiment, the cathodic member is comprised of a material capable of forming a galvanic couple with the metal being dissolved, such as aluminum. In one embodiment, for instance, the cathodic member may be comprised of a material that does not dissolve in the dissolution solution, which may comprise heated nitric acid. In this regard, the cathodic member is preferably made from a material that does not adversely interfere with the process or lead to any unwanted contaminants. In one embodiment, the cathodic member may comprise graphite. In an alternative embodiment, the cathodic member may comprise a metallic material.

When the cathodic member comprises a metallic material, various different types of metals may be used. For instance, the cathodic member may comprise gold, platinum, titanium, a stainless steel alloy, a nickel-copper alloy, a nickel-chromium alloy, or mixtures thereof. In one particular embodiment, the cathodic member may comprise an alloy based on nickel and chromium. For instance, the cathodic member may comprise an austenitic superalloy containing from about 40% to about 80% nickel and from about 10% to about 30% chromium. For instance, one such alloy is marketed under the name INCONEL alloy. In addition to containing nickel and chromium, the alloy may contain iron, molybdenum, niobium, cobalt, manganese, copper, aluminum, titanium, silicon, carbon, sulfur, phosphorus, and/or boron. Iron, molybdenum and cobalt may generally be present in an amount from about 1% to about 15% by weight, niobium may be present in an amount from about 0.5% to about 7% by weight. The remaining elements, if present, are generally present in an amount less than 1% by weight, such as in an amount less than 0.5% by weight.

Nickel and chromium superalloys as described above may provide various advantages and benefits for use in the present disclosure. For instance, such materials are resistant to acids, such as nitric acid. In addition, the alloys are well suited for use in extreme environments and can be subjected to high pressure and kinetic energy. The materials also retain strength over a wide temperature range.

The use of a cathodic member in accordance with the present disclosure can provide many advantages and benefits. As explained above, the cathodic member can control the rate of dissolution of the metal. In one embodiment, the cathodic member can quench the metal dissolution process, even when the metal remains submerged in the acid catalyzed solution. The quenching of the reaction occurs without removing the metal from the solution which provides a significant safety advantage. In addition, quenching occurs without the addition of chemicals that may affect downstream processes, Another significant advantage is that the quenching is reversible. The reaction or dissolution of the metal can be restarted by removing the cathodic member. In this manner, the cathodic member can be used as a stop and start mechanism for the process.

As described above, the method of the present disclosure is particularly well suited for controlling the dissolution of aluminum when reprocessing fuel assemblies or spent fuel plates. In order to reprocess spent fuel assemblies, for instance, the fuel assemblies are typically suspended above and gradually lowered into a dissolution solution. The dissolution solution can include an acid and a metal catalyst. The acid may comprise heated nitric acid in combination with a mercury catalyst. The dissolution solution dissolves the aluminum so that the aluminum can be separated from the nuclear fuel, which may comprise uranium.

The amount of metal catalyst contained in the dissolution solution generally depends upon the concentration of acid and/or the amount of aluminum that needs to be dissolved. In general, the metal catalyst, such as mercury, is present in the dissolution solution in an amount greater than about 0.001 molar, such as greater than about 0.02 molar, such as greater than about 0.03 molar. The catalyst concentration is generally less than about 0.1 molar, such as less than about 0.08 molar, such as less than about 0.06 molar, such as less than about 0.04 molar, such as less than about 0.02 molar.

The acid present in the dissolution solution comprises any suitable acid capable of dissolving the aluminum in the presence of the metal catalyst. In one embodiment, nitric acid is used. The nitric acid can be heated in order to increase processing rates. For instance, the nitric acid can be heated to within about 10° C. of its boiling point. Alternatively, the nitric acid may be heated near to or at its boiling point. As aluminum dissolves, the nitric acid is consumed during the process releasing off-gases, such as nitrogen oxides and hydrogen. In one embodiment, as the process proceeds, the molar concentration of nitric acid decreases. In one embodiment, the initial molar concentration of nitric acid in the dissolution solution prior to beginning the process is greater than about 3 molar, such as greater than about 5 molar, such as greater than about 7 molar, such as greater than about 9 molar. The initial nitric acid concentration is generally less than about 16 molar, such as less than about 15 molar, such as less than about 12 molar, such as less than about 10 molar, such as less than about 9 molar. In one embodiment, the initial concentration of the nitric acid is from about 5 molar to about 8 molar.

The lowest or final concentration of nitric acid in the dissolution solution can depend upon various factors. In one embodiment, for instance, greater amounts of nitric acid can be added to the solution as the aluminum dissolves. In a batch process, however, the process will continue until virtually all of the aluminum has dissolved. In this embodiment, the final nitric acid concentration can be less than about 2 molar, such as less than about 1.5 molar, such as less than about 1 molar, such as less than about 0.5 molar. During the process, at least 95%, such as at least 96%, such as at least 97%, such as at least 98%, such as even at least 99% of the aluminum is dissolved.

The manner in which the dissolving metal, such as aluminum, is contacted with the cathodic member can vary. In one embodiment, for instance, the cathodic member may be in the form of a rod or bar that is brought into contact with the aluminum. The cathodic member can have any shape or configuration that will allow for greater surface area contact. For instance, the cathodic member can comprise a plate, a collar, a wire, or a bundle of wires for contact with the aluminum.

As stated above, the cathodic member can be used to decrease the rate of dissolution or can be used to completely stop the process. In one embodiment, a plurality of spent fuel assemblies may be dissolved simultaneously in the dissolution solution. In order to control the dissolution rate, one or more cathodic members can be used to contact one or more of the spent fuel assemblies. For instance, one or more fuel assemblies may be contacted with the cathodic member, while one or more other fuel assemblies may not be contacted with a cathodic member. In this manner, the overall rate of dissolution can be controlled. For instance, in one embodiment, the dissolution rate can be lowered in the beginning of the dissolution process (at low dissolved aluminum concentration) when the dissolution rates are the highest. After the aluminum concentration has risen in the solution, the cathodic members can then be separated from the remainder of the spent fuel rods or elements.

The present disclosure may be better understood with reference to the following example.

EXAMPLE

The following example demonstrates some of the advantages and benefits of the present disclosure.

Two identical aluminum coupons made from aluminum 1100 were lowered into a dissolution solution. The coupons had the approximate dimensions of 19 mm×11 mm×3 mm. A 1/16 inch hole was drilled into each coupon in order to fasten each coupon to a TEFLON polytetrafluoroethylene string. The coupons were lightly sanded and washed with soap and water.

Each coupon was lowered into a separate dissolver apparatus. The dissolver apparatus, which included an off-gas collection system, was assembled in a chemical hood. Each dissolver apparatus contained a boiling flask with multiple ports, a condenser, an in-line gas sample bulb, and a water-submerged gas collection bag.

Glass rods were arranged to allow for attachment of alloy coupons and penetration of the lid of the boiling flask. Compressed O-ring fittings were present for subsequent sealing of the glass rods, allowing for dissolution of the coupons without breaking the gas-sealed system by lowering each glass rod subsequently over the duration of the experiment.

Each experiment was conducted using a dissolution solution of 7 molar nitric acid, 0.1 molar potassium fluoride, and 0.002 molar of mercury.

In one experiment, the aluminum ahoy coupon was lowered into the solution as a control. The aluminum coupon began to rapidly dissolve and rapid gas evolution was observed originating from the coupon.

In a second experiment, the aluminum coupon was contacted with INCONEL 690 wire and lowered into the solution. When the aluminum coupon was contacted with the INCONEL wire, no visible dissolution was observed, which was evidenced by the absence of any off-gas. The aluminum coupon contacted with the cathodic member remained inert to the dissolution process.

The first and second experiments above were also performed simultaneously in the same dissolver apparatus and the same results were obtained.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for dissolving aluminum during the recovery of a nuclear fuel comprising:
   contacting a material containing aluminum and a nuclear fuel with a heated dissolution solution comprising an acid and a metal catalyst, the acid and the metal catalyst dissolving the aluminum; and
   contacting the aluminum with a cathodic member, the cathodic member comprising a material capable of forming a galvanic couple with aluminum, the cathodic member contacting a sufficient amount of surface area of the aluminum so as to decrease the dissolution rate of aluminum in the dissolution solution.

2. A process as defined in claim 1, wherein contacting the aluminum with the cathodic member reduces the dissolution rate of aluminum by at least 20%.

3. A process as defined in claim 1, wherein the cathodic member provides protection to the aluminum and prevents the aluminum from dissolving in the acid.

4. A process as defined in claim 1, wherein the cathodic member comprises a material that does not dissolve in the acid.

5. A process as defined in claim 1, wherein the cathodic member comprises a metallic material.

6. A process as defined in claim 1, wherein the cathodic member comprises an alloy.

7. A process as defined in claim 1, wherein the cathodic member comprises graphite.

8. A process as defined in claim 1, wherein the cathodic member comprises gold, platinum, titanium, a stainless steel alloy, a nickel-copper alloy, or mixtures thereof.

9. A process as defined in claim 1, wherein the cathodic member comprises a nickel-chromium-based alloy.

10. A process as defined in claim 1, wherein the cathodic member comprises an austenitic super alloy containing from about 40% to about 80% nickel and from about 10% to about 30% chromium.

11. A process as defined in claim 1, wherein the acid comprises nitric acid.

12. A process as defined in claim 11, wherein the initial nitric acid concentration in the dissolution solution is from about 4 molar to about 15 molar.

13. A process as defined in claim 1, wherein the metal catalyst comprises mercury.

14. A process as defined in claim 13, wherein the mercury concentration in the dissolution solution is from about 0.001 molar to about 0.02 molar.

15. A process as defined in claim 1, wherein the nuclear fuel comprises a used nuclear fuel.

16. A process as defined in claim 1, wherein the material containing aluminum and a nuclear fuel comprises an aluminum-uranium alloy or a uranium aluminide dispersed in a continuous aluminum phase.

17. A process as defined in claim 1, wherein the nuclear fuel comprises uranium, plutonium, or mixtures thereof.

18. A process as defined in claim 1, wherein the material containing aluminum and a nuclear fuel comprises a fuel assembly, the fuel assembly being lowered into a heated bath containing the acid and the metal catalyst, the fuel assembly being contacted by the cathodic member within the bath.

19. A process as defined in claim 16, wherein the material containing aluminum and the nuclear fuel comprises a core surrounded by an aluminum cladding, the core comprising the aluminum-uranium alloy or the uranium aluminide dispersed in a continuous aluminum phase.

* * * * *